Patented Jan. 27, 1948

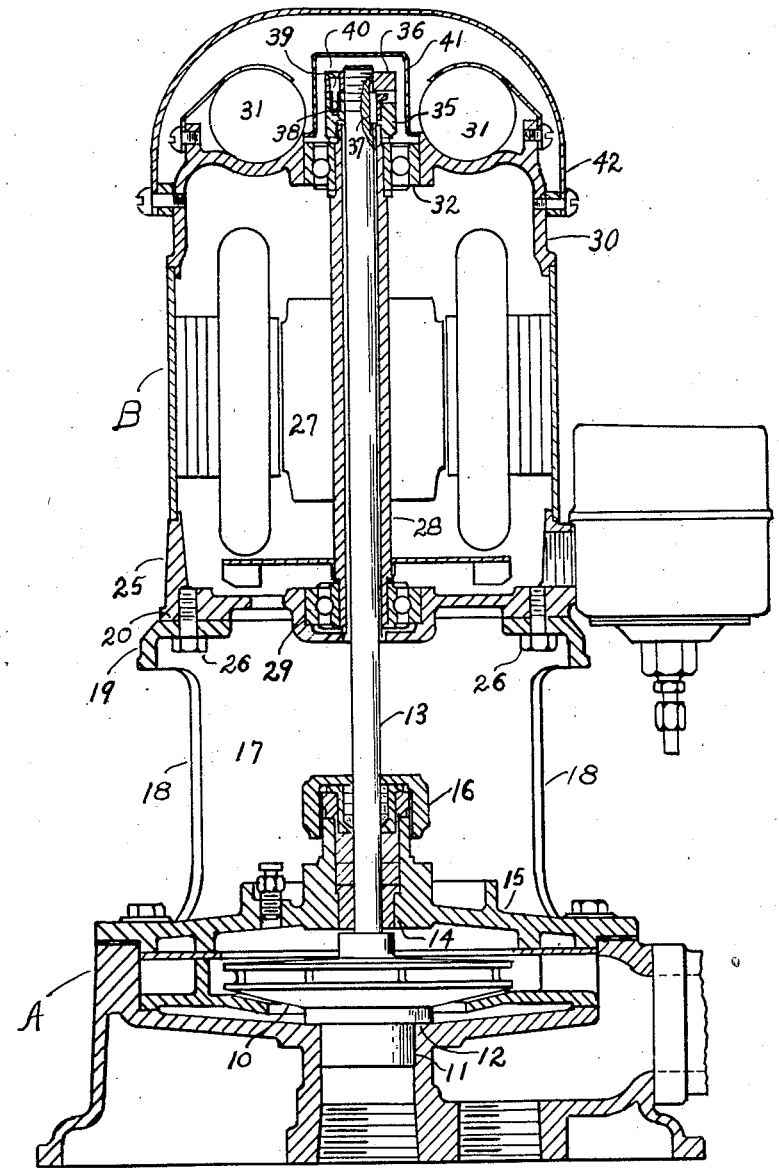

2,434,979

UNITED STATES PATENT OFFICE 2,434,979

MOTOR DRIVE FOR CENTRIFUGAL PUMPS

Charles J. Bergh, Racine, Wis., assignor to Jacobsen Manufacturing Company, Racine, Wis., a company of Wisconsin Application May 21, 1945, Serial No. 595,032

1 Claim. (Cl. 103—87)

The present invention relates to hollow shaft vertically positioned motors for centrifugal pump applications and more particularly to the use of standard type hollow tubing of the proper quality and dimensions usable in this type of design.

An object of the present invention is to provide a motor which eliminates the necessity of using a coupling between the pump and motor shafts.

Another object of the present invention is to provide a motor, whereby a number of points of possible misalignment and interference are eliminated by extending the shaft from the pump upwardly through the hollow motor shaft without contact therewith to an adjusting and driving mechanism at the upper ends of the shafts.

A still further object of the present invention is to provide a motor which can be easily and quicky detached from the pump assembly for inspection or repairs.

Another object of the present invention is to provide a design whereby close clearance adjustment of the pump impeller with the pump case can be made to obtain maximum sealing effect, which adjustment can be duplicated any time after an extended period of service.

To these and other useful ends my invention consists of parts, combinations of parts or their equivalents and mode of operation as hereinafter described and claimed in the accompanying drawings in which the single figure is a longitudinal sectional view through the pump and motor, illustrating the various parts which constitute my invention.

I provide an impeller pump which in its entirety is designated by reference character A. This pump is described in detail in my pending application for patent Serial Number 583,885, filed March 21, 1945.

The impeller in pump A is designated by reference numeral 10, having bearing and flange surfaces 11 and 12 respectively, the impeller having a vertically extending drive shaft 13 which is screw-threaded into or otherwise secured to impeller 10. Shaft 13 is rotatably mounted in a bearing sleeve 14, mounted in cap 15 of member A. This cap has a suitable packing gland 16 through which shaft 13 extends. Cap 15 is provided with an upwardly extending generally circular in cross section motor supporting base 17 with openings 18—18 on opposite sides thereof, which provide access to packing gland 16. The upper end of base 17 comprises a complete circular member 19 having a machine surface 20 on its top for the reception of a machined motor housing 25 and being held on surface 20 by means of a number of cap screws 26 which are also accessible because of openings 18.

The motor of my device is designated in its entirety by reference character B. The rotor 27 of the motor is mounted on a hollow shaft 28, through which shaft 13 loosely extends. Hollow shaft 28 is carried by ball bearing 29 mounted in the lower end of motor housing 25. The upper end of the motor housing 25 has a cap 30 on which the motor capacitors 31 are mounted.

Hollow shaft 28 is slidably rotatably held in member 30 by means of a ball bearing 32. This ball bearing insofar as hollow shaft 28 is concerned simply holds this shaft in a concentric position.

I provide means for driving shaft 13 and holding this shaft in its vertically adjusted position as follows: Shaft 28 is firmly screw-threaded in a collar 35 which rests on bearing 32. Shaft 13 is screw-threaded into a nut 36 which rests on collar 35 and holds this member firmly vertically. Member 35 is slidably key seated to shaft 13 as at 37 which may be adjusted in its vertical position relative to shaft 28 by turning nut 36. Member 35 is provided with a number of concentrically positioned screw-threaded openings 38 and member 36 is provided with an opening 39, for the reception of a screw 40 which may be positioned in any one of the openings 38.

Thus it will be seen that nut 36 may be loosened enough to permit flange 12 of the impeller to rest on its seat after which this nut is turned enough to raise the impeller slightly preferably 3 thousandths of an inch after which screw 40 is inserted into the nearest opening 38 and made fast. Openings 38 are spaced apart so shaft 15 is moved preferably vertically 3 thousandths of an inch when nut 36 is turned the distance between adjacent openings 38.

Cap 30 forms a closure for the top of the motor. I provide a cap 41 which is secured in any suitable manner to member 30. The object of this cap is to protect one from the whirling parts and protect bearing 32. I also provide a cap or shield 42 which protects the entire upper end of the motor and parts exposed which rests on the top of member 30. This cap as in 41 is removably secured to member 30.

One of the advantages of my design is that different length shafts 13 may be used for different pump installations; that is the motors of a certain size may be manufactured and stocked and the shafts may be manufactured in different lengths and stocked and assembled into the motor when the motor is attached to the pump and as the pump is assembled, and secured to the motor.

Thus it will be seen that the hollow shaft 28 is fixed in its vertical position by bearing 29 and that impeller 10 is carried by shaft 13 and fixed in its adjusted vertical position by nut 36. It will be seen that after the motor has been operating for an extended period screw 40 may be removed and nut 36 turned so the impeller flange 12 rests on the housing surface and then readjusted by turning nut 36 the distance between holes 38 and then locked; thus one may be assured that the impeller is carried on bearing 29 and that flange 12 clears its seat just enough to prevent metal contact but practically sealing against water leakage except a finite amount which is beneficial as a lubricant between member 10 and its bearing surface.

Thus it will be seen that applicant's impeller 10 is definitely carried by a ball bearing and held in axial position by sleeve 14; that shaft 13 is free in member 28 and carried on its upper end by shaft 28; that shaft 13 is driven by member 28 because of the key at 37.

It will be understood that various changes in details of construction may be made without departing from the spirit and scope of the invention as recited in the appended claim.

I claim:

A centrifugal pump and an electric motor for driving the same comprising, a pump housing, an adapter for supporting the motor on the housing, the rotor of said motor being mounted on a hollow shaft, a driven shaft extending freely through said hollow shaft and being longitudinally adjustably secured and keyed to the upper end of said hollow shaft, the lower end of said driven shaft being rotatably mounted in a stuffing box secured to the cover of the housing of said pump and having secured to its lower end the impeller member of the pump, the lower end of said impeller having an inlet, the outer surface of which is rotatably mounted in the inlet of the pump and having a flange adapted to be adjusted slightly out of contact with a corresponding seat in the housing, whereby the weight of the impeller will be carried by the driven shaft and the lower end of the impeller will be held concentrically with the driven shaft and whereby the flange on the impeller may be caused to rest on a seat for establishing the position for the impeller and then the adjustment of the driven shaft used to determine the distance between the flange of the impeller and its seat to thereby provide a very small flow of liquid between the flange and bearing of the impeller and to the inlet of the pump.

CHARLES J. BERGH.

REFERENCES CITED

The following references are of record in the file of this patent:

UNITED STATES PATENTS

| Number | Name | Date |
| --- | --- | --- |
| 1,530,724 | Hollander | Mar. 24, 1925 |
| 1,687,658 | Conant | Oct. 16, 1928 |
| 1,920,315 | Myers | Aug. 1, 1933 |
| 1,945,833 | Swanson | Feb. 6, 1934 |
| 2,085,986 | Levier | July 6, 1937 |
| 2,106,058 | Nielsen et al. | Jan. 18, 1938 |
| 2,107,481 | Johnson | Feb. 8, 1938 |
| 2,139,379 | Myers | Dec. 6, 1938 |
| 2,164,837 | Pfleger | July 4, 1939 |
| 2,166,404 | Hait | July 18, 1939 |
| 2,298,131 | Johns | Oct. 6, 1942 |